UNITED STATES PATENT OFFICE.

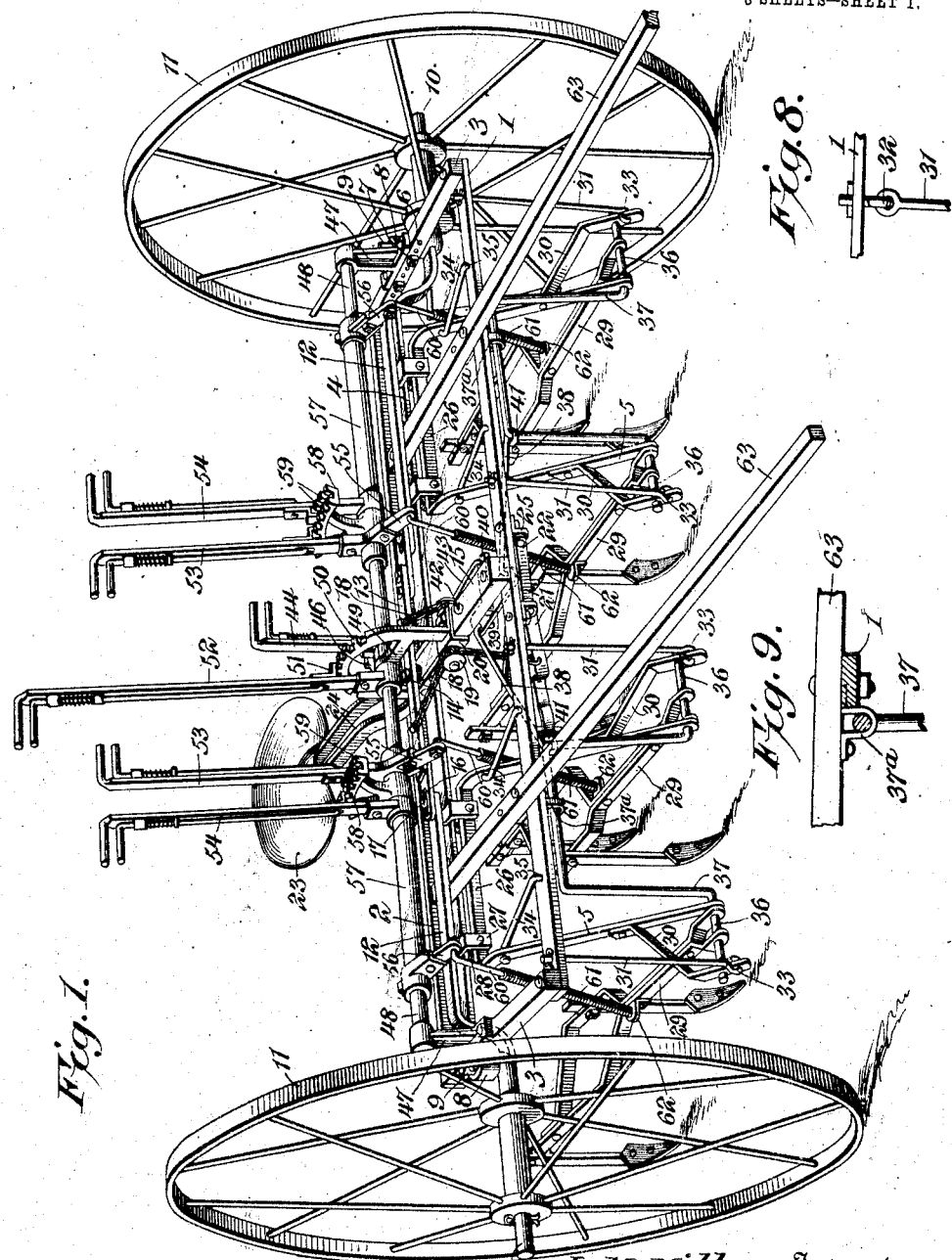

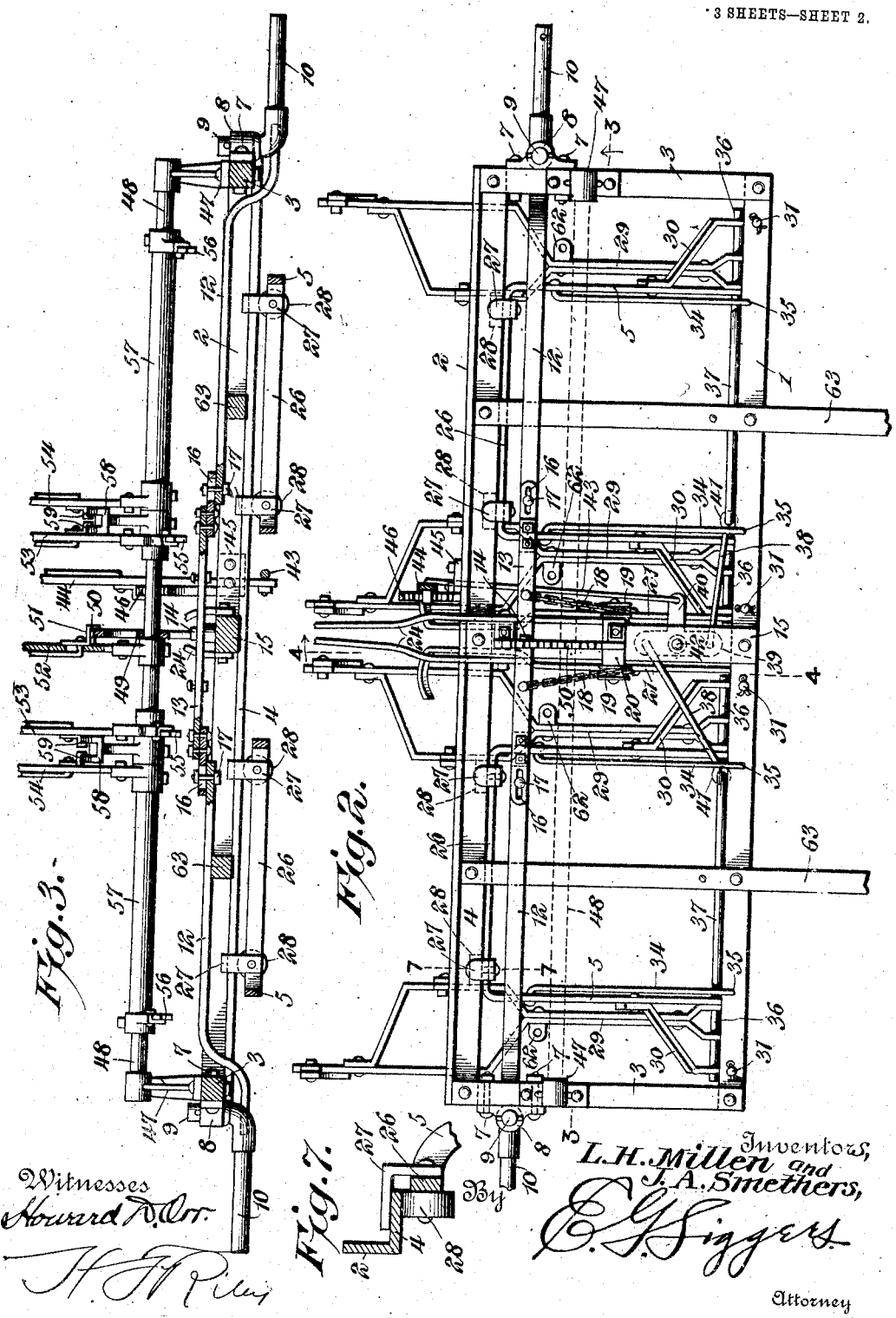

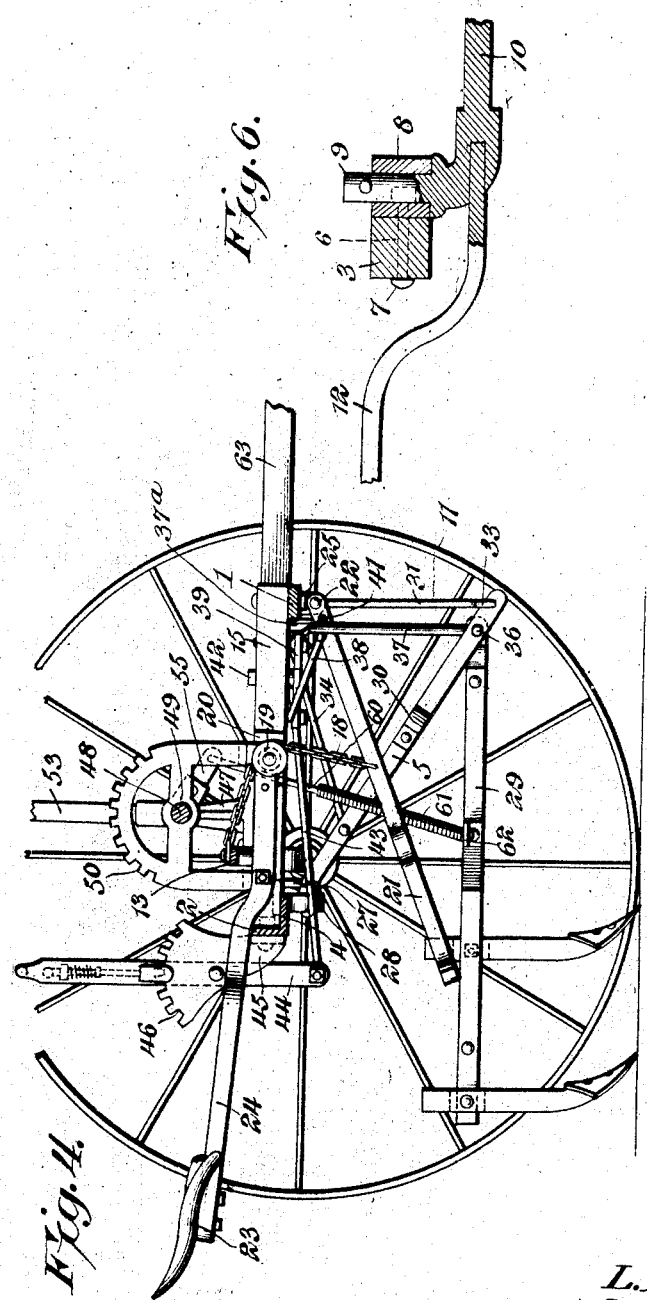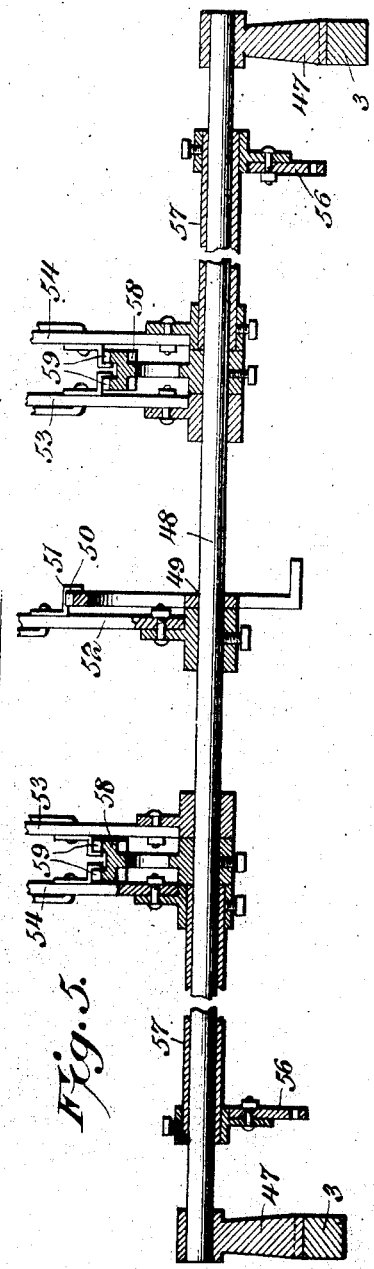

LINCOLN H. MILLEN AND JAMES A. SMETHERS, OF BEATRICE, NEBRASKA.

TWO-ROW CULTIVATOR.

No. 866,209.    Specification of Letters Patent.    Patented Sept. 17, 1907.

Application filed October 24, 1906. Serial No. 340,370.

*To all whom it may concern:*

Be it known that we, LINCOLN H. MILLEN and JAMES A. SMETHERS, citizens of the United States, residing at Beatrice, in the county of Gage and State of Nebraska, have invented a new and useful Two-Row Cultivator, of which the following is a specification.

The invention relates to improvements in two row cultivators.

The object of the present invention is to improve the construction of two row cultivators, and to provide a simple and comparatively inexpensive one of great strength and durability, provided with means for enabling the plow beams to be raised and lowered both simultaneously and independently to throw the cultivator into and out of operation, and also to position the cultivating device properly with relation to the character of the ground and the condition of the soil.

A further object of the invention is to provide means for enabling the plow beams to be readily adjusted laterally of the cultivator to arrange the same to suit the various widths of rows of corn.

Another object of the invention is to provide means for enabling the cultivator to be readily guided, either to the right or left to avoid hills or ruts and to overcome the side draft or strain, resulting from the unevenness of the ground.

The invention also has for its object to provide a cultivator of this character in which the main frame of the machine will be adjustable backwardly and forwardly with relation to the axles to enable the machine to be adjusted to suit the size or weight of the driver, so that the machine will be properly balanced.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a two row cultivator, constructed in accordance with this invention. Fig. 2 is a plan view. Fig. 3 is a transverse sectional view, taken substantially on the line 3—3 of Fig. 2. Fig. 4 is a longitudinal sectional view, taken substantially on the line 4—4 of Fig. 2. Fig. 5 is an enlarged detail sectional view, illustrating the manner of mounting the continuous transverse shaft and the levers for raising and lowering the plow beams. Fig. 6 is an enlarged detail sectional view, illustrating the manner of pivoting the axles. Fig. 7 is a detail sectional view, taken substantially on the line 7—7 of Fig. 2 and illustrating the manner of slidably mounting the arch supporting frames. Fig. 8 is a detail sectional view, illustrating the manner of hinging the upper terminals of the hanger rods, which connect the arch supporting frames with the front of the main frame. Fig. 9 is a detail view, illustrating the manner of slidably connecting the tops of the arches with the main or supporting frame.

Like numerals of reference designate corresponding parts in all the figures of the drawings.

The main or supporting frame of the machine is composed of front and rear transverse bars 1 and 2 and side bars 3, suitably secured at their ends to the terminals of the front and rear transverse bars. The rear transverse bar 2 is constructed of angle iron, or other flanged metal, and consists of a vertical flange and a horizontal flange 4, which constitutes a track or guide for a pair of arch supporting frames 5.

The side bars 3 are provided with transverse perforations 6, arranged at intervals and adapted to receive bolts 7 for adjustably securing bearings 8 to the outer edges of the side bars. The bearings 8 receive vertically projecting pivots 9 of axles 10, and are adjustable backwardly and forwardly to arrange the main frame properly with relation to the axles to suit the size or weight of the driver, so that the machine will be properly balanced when in use. The upwardly extending pivots 9 of the axles are secured in the bearings 8 by keys, or other suitable fastening devices.

The spindles of the axles 10 receive carrying wheels 11 and are provided with inwardly extending arms 12, which are connected at their inner ends with a centrally arranged transversely disposed lever 13. The transverse lever 13, which is located at the rear portion of the main frame of the cultivator, is pivoted by a bolt 14 to a central longitudinal connecting bar or member 15 of the main frame. The central connecting bar or member 15, which is suitably secured to the front and rear transverse bars of the main frame, constitutes a rigid portion of the latter and braces the same at the center thereof. The lever 13 is provided at its ends with longitudinal slots 16, which receive pivot bolts 17 of the arms 12 of the axles, whereby the ends of the rear transverse lever are slidably connected with the arms of the axles, and are adapted to oscillate the same when the rear transverse lever 13 is swung on its pivot.

The rear transverse lever 13 is connected at opposite sides of its center to the rear end of a pair of flexible connections, consisting of chains 18, extending forwardly from the said transverse lever to a pair of pulleys or sheaves 19, and depending therefrom. The pulleys or sheaves, which form guides for the chains 18, are suitably mounted at opposite sides of a bracket 20, and the depending ends of the chains 19 are connected to a pair of foot levers 21, which are arranged at an inclination, as clearly illustrated in Fig. 4 of the drawings, and which are pivotally connected at their front ends 22 to the front transverse bar 1 of the main frame. The foot levers have their rear terminals located within convenient reach of the driver, a seat 23 being connected with the central bar 14 by means of a pair of bars or standards 24, as clearly illustrated in Figs. 1 and 2 of the drawings. The seat projects rearwardly from the main frame, and the foot levers are adapted to be depressed for oscillating the rear transverse lever 13. When the transverse lever is swung in one direction, the wheels will be swung toward one side of the cultivator, and when the rear lever 13 is moved in the opposite direction, the wheels will be swung towards the opposite side of the cultivator. By this construction the cultivator may be readily turned to either side and may be easily guided to clear ruts, hills, obstructions and the like. The front ends 22 are pivoted by bolts, or other suitable fastening devices to depending ears of substantially L-shaped plates or brackets 25, which are suitably secured to the front transverse bar of the main frame.

The arch supporting frames 5, which are located at opposite sides of the center of the cultivator, each consists of a pair of inclined sides or bars and a transverse connecting bar or portion 26, located at the rear transverse bar 2 of the main frame and slidably connected with the same by means of substantially L-shaped plates or pieces 27 and rollers 28. The L-shaped plates or pieces 27 are suitably secured to the transverse bar or portion 26 of the arch supporting frames, and extend upwardly and rearwardly therefrom and form a pair of rearwardly projecting lugs, which project over the horizontal flange of the rear transverse bar 2. The rollers 28, which are located beneath the horizontal flange of the rear transverse bar, are in practice held against the same by the draft, which results in an upward pressure on the inclined arch supporting frames 5, and the said rollers or wheels form anti-friction devices and reduce the friction and enable the arch supporting frames to be easily moved transversely of the cultivator to move the plow beams 29 inwardly and outwardly to arrange the same to suit the width of rows of the corn.

The arch supporting frame is provided at opposite sides with laterally extending bars or members, consisting of angularly disposed rear portions 30 and front portions, which are arranged in substantial parallelism with the sides of the arch supporting frames 5. The inclined sides of the arch supporting frames 5 extend downwardly and forwardly from the rear portion of the main frame, and they are connected with the front portion of the main frame by means of hanger rods 31, hinged at their upper ends at 32 to the front transverse bar of the main frame, and pivotally or hingedly connected at their lower ends 33 to the front ends of the laterally extending bars or members 30 of the arch supporting frame. The lower ends of the hanger rods are provided with eyes, which are linked into perforations of the front ends of the bars 30, but any other form of hinge or pivot may be employed. The upper ends of the inclined sides of the arch supporting frames are connected with the front transverse bar 1 of the main frame by means of approximately horizontal bracing rods 34. The rear terminals of the bracing rods 34 are bent at an angle and pierce the sides of the arch supporting frames, and the front ends 35 of the rods 34 are bent downward at an angle to form vertical pivots, which pierce the front transverse bar of the main frame. The rear portions of the arch supporting frames loosely receive or engage the horizontal flange of the rear transverse bar 2 of the main frame, and there is sufficient play of the parts to enable the arch supporting frames to be readily moved laterally of the cultivator the desired distance to suit the width of rows of the corn.

The plow beams, which may be constructed in any desired manner, and which may be provided with any preferred form of cultivating blade or shovel, are provided at their front ends with suitable perforations for the reception of laterally extending pivots 36 of arches 37, which are composed of vertical sides and a connecting top portion. The pivots 36, which extend outward from the sides of the arches 37, pierce the lower ends of the inclined sides 5 and the outer portions of the laterally projecting braces or members 30, and the plow beams are adapted to swing upwardly and downwardly on the said pivots. The tops of the arches are slidably connected with the main or supporting frame by guides 37ª, consisting preferably of metallic straps and secured to and depending from the draft bars or beams. The guides, which are adapted to prevent the arches from swinging backwardly or forwardly in the bearings of the arch supporting frames, and the laterally extending bars or members thereof prevent the arches moving transversely of the machine. The arches are connected by rods 38 with forwardly and rearwardly projecting arms of a substantially T-shaped lever 39, which has a laterally projecting arm 40. The rods 38 are provided at their outer ends with eyes 41, which embrace the inner sides of the arches at the upper ends thereof, but the rods may be connected with the arches in any other desired manner. The T-shaped lever is located beneath the central longitudinal bar 15 of the main frame, and is pivotally connected with the same by a bolt 42, which pierces the center of the T-shaped lever. The laterally extending arm 40 of the T-shaped lever is connected by a rod 43 with a short operating lever 44, fulcrumed at an intermediate point on a bracket 45, which is provided with a toothed segment 46. The lower arm of the operating lever 44 is connected to the rear end of the rods 43, and the upper arm of the lever is provided with a spring actuated dog or detent for engaging the toothed segment, whereby the operating lever 44 is locked in its adjustment.

The main frame is provided at points intermediate of the ends of the side bars 3 with bearing brackets 47, having upwardly projecting arms and provided at the upper ends thereof with bearings for the reception of a continuous transverse shaft 48, which is also journaled in a suitable bearing of an intermediate bracket 49. The intermediate bracket is also provided with a toothed segment 50, which is adapted to be engaged by a spring actuated dog or detent 51 of a central operating lever 52. The central operating lever 52 is fixed to the continuous transverse shaft, and is adapted to raise and lower the plow beams simultaneously as hereinafter explained. The transverse shaft 48 also supports inner and outer side levers 53 and 54. The inner levers 53, which are loosely mounted on and adapted to swing independently of the continuous transverse shaft 48, are provided at their lower ends with forwardly projecting arms 55 and the outer levers 54, which are also capable of movement independently of the continuous transverse shaft 48, are connected with forwardly projecting arms 56 by sleeves 57. The inner and outer side levers 53 and 54 are located at opposite sides of a double ratchet member or bracket 58, having spaced series of teeth 59 adapted to be engaged by spring actuated dogs or detents of the intermediate and side levers, whereby the latter are locked rigid with the continuous shaft 48. The side levers are located within easy reach of the driver, the arms 55 of the inner levers being located above the plow beams, which are connected with the inner sides of the arches. The sleeves 57 extend across the space between the plow beams, and the arms 56 are connected with the outer beams. The said arms 55 and 56 are preferably connected with the plow beams by means of rods 60, having springs 61, which are adapted to yieldably hold the cultivating devices in the ground. The rods 60 are pivotally connected with the arms 55 and 56, and the plow beams are provided with perforated ears 62 through which the lower ends of the rods 60 pass. The springs 61, which are disposed on the rods, engage the ears 62, and are thereby adapted to exert a downward pressure on the plow beams, when the latter are in engagement with the soil.

The ratchet members or brackets 58 are fixed to the continuous transverse shaft, and when the side levers are interlocked with the interposed ratchet members 58, the plow beams may be simultaneously raised and lowered by operating the central or main lever 52. Any one of the plow beams may be adjusted independently of each other by means of its individual operating lever, and this independent adjustment of the plow beams will enable the cultivating devices to be properly adjusted to suit the character of the ground, which may have hills and ruts and which necessitates one plow beam being lower than another.

The draft bars or beams 63 are secured to the front and rear transverse bars of the main frame, and the arms 12 of the axles are bent upwardly and arched to clear the rear ends of the draft bars or beams.

Having thus fully described our invention, what we claim as new and desire to secure by Letters Patent, is:—

1. In a cultivator, the combination of a main frame, cultivating devices carried by the main frame, an axle, a seat mounted on the main frame and extending in rear of the axle, and means for adjustably securing the main frame to the axle for moving the main frame backwardly or forwardly on the axle to balance the cultivator.

2. In a cultivator, the combination of a main frame provided with sides having perforations arranged at intervals, bearings adjustable backwardly and forwardly on the sides of the main frame and provided with fastening devices arranged in the said perforations, axles having pivots fitting in the said bearings, and operating mechanism connected with the axles.

3. In a cultivator, the combination with a main frame, and cultivating devices, of pivotally mounted axles, an intermediate lever having opposite arms connected with the axles, foot levers, and flexible connections extending from the intermediate lever to the foot levers.

4. In a cultivator, the combination with a main frame, pivotally mounted axles provided with transverse arms, an intermediate lever extending across the space between the said arms and fulcrumed between its ends, said lever being connected with the arms of the axles, foot levers fulcrumed on the frame, and flexible connections extending from the intermediate lever to the foot levers.

5. In a cultivator, the combination with a main frame, of pivoted axles having arms, an intermediate lever connected with the arms of the axles, guide pulleys spaced from the intermediate lever, flexible connections connected with the intermediate lever at opposite sides of the fulcrum thereof and extending to and depending from the said pulleys, and foot levers connected with the depending portions of the flexible connections.

6. In a cultivator, the combination of a main frame, axles provided at their inner ends with upwardly extending pivots mounted on the main frame, arched arms extending transversely of the cultivator from the axles at the lower end of the said pivots, a centrally pivoted intermediate lever connected with the arched arms and completing the arches, and operating mechanism connected with the intermediate lever.

7. In a cultivator, the combination of a main frame, inclined arch supporting frames slidably connected at the top with the main frame, arches connected with the said supporting frames at the bottom thereof, and operating mechanism connected with the arches for moving the same laterally of the main frame.

8. In a cultivator, the combination of a main frame, inclined arch supporting frames slidably connected at the top with the main frame at the rear portion thereof, arches mounted on the supporting frames at the lower portions thereof, oscillatory braces extending from the front portion of the main frame to the arch supporting frames, and means for adjusting the arches laterally of the main frame.

9. In a cultivator, the combination of a main frame, inclined arch supporting frames slidably connected at the back with the main frame, means hinged to the front of the main frame for connecting the supporting frames with the same, arches mounted on the inclined supporting frames, and operating mechanism for moving the arches laterally of the main frame.

10. In a cultivator, the combination of a main frame provided at the back with a transverse bar, inclined arch supporting frames extending downwardly and forwardly from the transverse bar and provided with rearwardly projecting lugs engaging the bar at the upper face thereof, antifriction devices mounted on the arch supporting frames and fitting against the transverse bar at the lower face thereof, arches connected with the supporting frames at the front portions thereof, and means for adjusting the arches laterally of the main frame.

11. In a cultivator, the combination of a main frame, arch supporting frames slidably connected with the rear portion of the main frame, braces hinged to the front portion of the main frame and connected with the said supporting frames, arches carried by the supporting frames, plow beams connected with the arches, and operating mechanism also connected with the arches for moving the same laterally of the main frame.

12. In a cultivator, the combination of a main frame, arch supporting frames movable laterally of the main frame, arches carried by the supporting frames, an intermediate lever connected with the arches for moving the same laterally of the main frame, and operating means for the said lever.

13. In a cultivator, the combination of a main frame, arch supporting frames movably connected with the main frame, arches carried by the supporting frames, an intermediate lever mounted on the main frame and connected with the arches, and an operating lever located in rear of and connected with the intermediate lever.

14. In a cultivator, the combination of a main frame, inclined arch supporting frames connected at the top with the rear portion of the main frame, hanger bars depending from the front of the main frame and connected with the front portions of the supporting frames, arches carried by the supporting frames, and means for adjusting the arches.

15. In a cultivator, the combination of a main frame, inclined arch supporting frames connected at the top with the main frame, hanger rods depending from the main frame and connected with the lower portions of the supporting frames, oscillatory braces connecting the upper portions of the supporting frames with the main frame, arches carried by the supporting frames, and means for adjusting the arches.

16. In a cultivator, the combination of a main frame, inclined arch supporting frames slidably connected with the main frame and extending downwardly and forwardly from the main frame, hangers depending from the main frame and connected with the lower portions of the supporting frames, oscillatory braces extending rearwardly from the main frame to the upper portions of the supporting frames, arches mounted on the supporting frames, and means for adjusting the arches laterally of the main frame.

17. In a cultivator, the combination of a main frame, inclined arch supporting frames slidably connected at the top with the main frame and provided with laterally projecting members, hangers depending from the main frame and connected to the laterally extending members of the supporting frames, arches having laterally extending pivots connected with the supporting frames and with the laterally extending members thereof, and means for adjusting the arches.

18. In a cultivator, the combination of a main frame, cultivating devices movable upwardly and downwardly, a continuous transverse shaft extending across the cultivator, inner side levers loosely mounted on the shaft and provided with arms, outer side levers also mounted on the shaft and provided with outwardly extending sleeves having arms, means for adjustably connecting the side levers with the shaft for locking the arms rigid with the same, means for connecting the arms with the cultivating devices, and means for operating the shaft for adjusting the cultivating devices simultaneously.

19. In a cultivator, the combination with a main frame, and cultivating devices, of a continuous transverse shaft extending across the main frame, ratchet devices fixed to the shaft, inner and outer side levers loosely mounted on the shaft at opposite sides of the ratchet devices and provided with means for adjustably engaging the same, the inner side levers being provided with arms, outer arms spaced from and connected with the outer side levers, and means for connecting the arms with the cultivating devices.

20. In a cultivator, the combination with a main frame, and cultivating devices, of a transverse shaft mounted on the main frame and extending across the cultivator, a main lever fixed to the shaft, inner and outer side levers, arms connected with the inner and outer side levers and the cultivating devices, means for adjustably securing the side levers to the shaft, and means for securing the main lever in its adjustment.

21. In a cultivator, the combination of a main frame having intermediate and side bearings, the intermediate bearings being provided with a ratchet member, cultivating devices, a continuous transverse shaft journaled in the said bearings, a main lever fixed to the shaft and provided with means for engaging the said ratchet member, inner and outer independently adjustable side levers, loosely mounted on the continuous shaft and arranged in pairs, said side levers being provided with arms connected with the cultivating devices, and means for locking the side levers rigid with the shaft.

22. In a cultivator, the combination of a main frame, a continuous shaft extending across the main frame, inner and outer plow beams arranged in pairs, inner side levers loosely mounted on the shaft and provided with arms connected with the inner plow beams, outer side levers having sleeves provided with arms connected with the outer plow beams, means for adjustably connecting the side levers with the shaft, and means for operating the shaft.

23. In a cultivator, the combination of a main frame, inclined arch supporting frames slidably connected at the top with the main frame, arches also slidably connected at the top with the main frame and mounted on the arch supporting frames at the bottom thereof, and means for moving the arches transversely of the machine.

24. In a cultivator, the combination of a main frame, inclined arch supporting frames slidably connected at the top with the main frame at the rear thereof and extending downwardly and forwardly, arches mounted on the supporting frames, guides depending from the main frame and receiving the tops of the arches, and means for moving the arches transversely of the cultivator.

25. In a cultivator, the combination of a main frame provided with draft beams, arch supporting frames slidably mounted on the main frame, guides depending from the draft beams, arches slidable in the guides and connected at the bottom with the supporting frames, and means for moving the supporting frames transversely of the cultivator.

26. In a cultivator, the combination of a main frame, inclined arch supporting frames slidably connected at the top with the main frame and having bearings at the bottom, arches provided at the bottom with laterally extending pivots arranged in the said bearings, guides slidably connecting the tops of the arches with the main frame, and beams mounted on the said pivots and having cultivating devices.

In testimony, that we claim the foregoing as our own, we have hereto affixed our signature in the presence of two witnesses.

LINCOLN H. MILLEN,
JAMES A. SMETHERS.

Witnesses:
E. G. DRAKE,
GEO. G. HILL.